United States Patent
Suzuki (10) Patent No.: US 6,958,087 B2
(45) Date of Patent: Oct. 25, 2005

(54) GAS SEPARATOR FIXING STRUCTURE AND GAS SEPARATING DEVICE USING THE SAME

(75) Inventor: Kenji Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/822,131

(22) Filed: Apr. 9, 2004

(65) Prior Publication Data

US 2004/0187690 A1 Sep. 30, 2004

Related U.S. Application Data

(63) Continuation of application No. PCT/JP02/10961, filed on Oct. 22, 2002.

(30) Foreign Application Priority Data

Oct. 23, 2001 (JP) ........................................ 2001-324411

(51) Int. Cl.⁷ ........................... B01D 53/22; B01D 71/02
(52) U.S. Cl. ........................... 96/10; 95/56; 96/8; 96/11
(58) Field of Search ............................. 96/4, 8, 10, 11; 95/55, 56

(56) References Cited

U.S. PATENT DOCUMENTS

| | | | | |
|---|---|---|---|---|
| 2,671,337 A | * | 3/1954 | Hulsberg ................... | 73/31.04 |
| 3,437,357 A | * | 4/1969 | Rubin ......................... | 285/55 |
| 3,761,382 A | * | 9/1973 | Hammond et al. ......... | 204/266 |
| 5,034,125 A | * | 7/1991 | Karbachsch et al. ..... | 210/321.8 |
| 5,131,261 A | * | 7/1992 | Tou et al. ....................... | 73/38 |
| 5,614,001 A | | 3/1997 | Kosaka et al. | |
| 6,139,810 A | * | 10/2000 | Gottzmann et al. ......... | 422/197 |
| 6,309,444 B1 | * | 10/2001 | Sims et al. .................... | 95/46 |
| 6,554,015 B1 | * | 4/2003 | Witt .............................. | 137/2 |
| 2001/0013272 A1 | * | 8/2001 | Blase et al. ..................... | 96/8 |
| 2001/0035093 A1 | * | 11/2001 | Yokota ........................... | 96/8 |

FOREIGN PATENT DOCUMENTS

| | | |
|---|---|---|
| JP | 56-24486 Y2 | 6/1981 |
| JP | 56-48539 B2 | 11/1981 |
| JP | 58-204880 A1 | 11/1983 |
| JP | S62-273030 A1 | 11/1987 |
| JP | S63-171617 A1 | 7/1988 |
| JP | 03/120851 A1 | 5/1991 |

* cited by examiner

Primary Examiner—Robert H. Spitzer
(74) Attorney, Agent, or Firm—Burr & Brown (57) ABSTRACT

The gas separator fixing structure of the present invention is characterized in that it is provided with a gas separator 10 having a gas separation membrane 30 formed on at least one surface of a tubular support 31 having a through hole 7 in axial direction and comprising porous ceramics, a cap-like metal member 1 and a ring-shaped metal member 4 are fixed to one and the other open end of the gas separator 10 through seal members, respectively, and seal members are gland packings 11 and 12. A gas separating device can be provided in which there hardly occurs breakage of the tubular support constituting the gas separator 10 due to the thermal stress and there hardly occurs reduction of air-tightness between the gas separator 10 and the supporter supporting the gas separator caused by load of heat cycles, and besides which can be used even under the conditions of high temperatures.

23 Claims, 4 Drawing Sheets

GAS SEPARATOR FIXING STRUCTURE AND GAS SEPARATING DEVICE USING THE SAME

CROSS REFERENCE TO RELATED APPLICATIONS

This application is a continuation of International Application No. PCT/JP02/10961 having an international filing date of Oct. 22, 2002, which designated the United States, the entirety of which is incorporated herein by reference.

This application also claims the benefit of Japanese Application 2001–324411, filed Oct. 23, 2001, the entirety of which is incorporated herein by reference.

TECHNICAL FIELD

The present invention relates to a gas separator fixing structure and a gas separating device using the same.

BACKGROUND ART

Hitherto, for obtaining only a specific gas component from a multi-component mixed gas, it has been known to use an organic or inorganic gas separation membrane.

As the separation membrane used for membrane separation method, there have been known organic polymer membranes such as of polyimide and polysulfone as hydrogen separation membranes and inorganic compound membranes such as palladium or palladium alloy membranes. Particularly, palladium or palladium alloy membranes have heat resistance and, furthermore, can give hydrogen of very high purity.

Palladium or palladium alloy membranes have property of permeating hydrogen in the form of a solid solution, and utilizing this property, thin membranes of palladium or palladium alloys are widely used as hydrogen separators for separating hydrogen from a mixed gas containing hydrogen.

As to related conventional techniques, JP-A-62-273030 and JP-A-63-171617 disclose a gas separator comprising a porous substrate, one surface of which is covered with a gas separation membrane comprising palladium or a palladium alloy, in which the porous substrate comprises ceramics such as glass and aluminum oxide. Since the gas separation membrane alone is insufficient in mechanical strength, the gas separation membrane is put on a porous substrate.

A gas separating device having the above gas separator incorporated therein has a structure in which a gas to be treated is introduced from one side of the gas separator, and only a specific gas permeates through the gas separator and purified hydrogen gas is obtained from another side of the gas separator. Therefore, it is important that the side of gas to be treated and the side of purified gas should be air-tightly separated to inhibit leakage of the gas to be treated to the purified gas side from the joint part of the gas separator and the support. On the other hand, in order to efficiently separate hydrogen gas using a gas separator, it is advantageous to carry out the separation at high temperatures and under high pressures, namely, at 300° C. or higher, preferably 500° C. or higher under 5–20 atm for increasing the diffusion rate of hydrogen atom or the like through the gas separation membrane.

In order to inhibit leakage of gas under the above conditions, generally the gas separator and the support are bonded with glass or brazing material (glass bonding, brazing). Furthermore, when the gas treating temperature is lower than 250° C., air-tightness between the gas separator and the support is ensured using an O-ring made of resin or rubber.

However, when the gas separator and the support are bonded by the above-mentioned glass bonding or brazing, there may be supposed occurrence of the problem that the porous substrate constituting the gas separator is broken by thermal stress or air-tightness between the gas separator and the support is lowered with loading of heat cycles. Furthermore, not only the gas separator and the support must be bonded with severely controlling the clearance between them, but also there may occur the problem such as distortion caused by thermal stress because of the high bonding temperature.

In the case of securing the air-tightness between the gas separator and the support using an O-ring made of resin or rubber, when the treating temperature of gas is higher than 250° C., it is substantially difficult to secure sufficient air-tightness, and as a result, the range of operation temperature is restricted.

The present invention has been made in view of these problems in conventional techniques, and the object of the present invention is to provide a gas separator fixing structure and a gas separating device using the same in which the base which constitutes the gas separator is hardly broken by thermal stress and the air-tightness between the gas separator and a support supporting the gas separator is hardly lowered, and which are usable under the conditions of high temperatures.

DISCLOSURE OF THE INVENTION

That is, according to the present invention, there is provided a gas separator fixing structure provided with a gas separator having a gas separation membrane formed on at least one surface of a tubular support having a through hole in axial direction and comprising porous ceramics, characterized in that a cap-like metal member and a ring-shaped metal member are fixed to one and the other open end of the gas separator through seal members, respectively, and seal members are gland packings.

In the present invention, it is preferred that the cap-like metal member comprises a first cap-like or ring-shaped packing presser which gives a tightening pressure to one gland packing in the axial direction of the tubular support and a ring-shaped or cap-like lower stopper which inhibits movement of the one gland packing, and the ring-shaped metal member comprises a second ring-shaped packing presser which gives a tightening pressure to another gland packing in the axial direction of the tubular support and a ring-shaped upper stopper which inhibits movement of the another gland packing.

In the present invention, it is preferred that the first packing presser has a convex shape which directly presses one gland packing by its tip portion, and the lower stopper has a concave shape which directly contacts with the one gland packing and fits to the convex shape of the first packing presser, and the second packing presser has a convex shape which directly presses another gland packing by its tip portion, and the upper stopper has a concave shape which directly contacts with the another gland packing and fits to the convex shape of the second packing presser.

Furthermore, according to the present invention, there is provided a gas separator fixing structure provided with a gas separator having a gas separation membrane formed on at least one surface of a tubular support having a through hole in axial direction and comprising porous ceramics, characterized in that ring-shaped metal members are fixed to both open ends of the gas separator through seal members, respectively, and the seal members are gland packings.

In the present invention, it is preferred that the ring-shaped metal member comprises a ring-shaped packing presser which gives a tightening pressure to the gland packing in the axial direction of the tubular support and a ring-shaped stopper which inhibits movement of the gland packing.

In the present invention, it is preferred that the ring-shaped packing presser has a convex shape which directly presses the gland packing by its tip portion, and the ring-shaped stopper has a concave shape which directly contacts with the gland packing and fits to the convex shape of the ring-shaped packing presser.

In the present invention, it is preferred that the tubular support has a plurality of through holes arranged in rows.

In the present invention, it is preferred that the maximum value of operating temperature range of the gland packing is 300° C. or higher, and the maximum value of operating temperature range of the gland packing in a non-oxidizing atmosphere is 350° C. or higher, and more preferably 600° C. or higher.

Moreover, in the present invention, it is preferred that the main component of the gland packings is expanded graphite and the porous ceramics is alumina.

Furthermore, in the present invention, it is preferred that the gas separation membrane is a hydrogen separation membrane through which hydrogen selectively permeates and the gas separation membrane comprises palladium or a metal containing palladium.

In the present invention, it is preferred that materials constituting the cap-like metal member and/or ring-shaped metal member have a thermal expansion coefficient of $10 \times 10^{-6}$/° C. or lower, and, furthermore, the materials constituting the cap-like metal member and/or ring-shaped metal member are Permalloy.

The gas separator fixing structure of the present invention can be suitably used at a temperature in the range of 250–1650° C., more preferably 300–600° C. Moreover, it can be suitably used under a pressure of 0.1–10 MPa in the total pressure of the gas to be treated.

Furthermore, according to the present invention, there is provided a gas separating device provided with a pressure vessel, characterized in that the ring-shaped metal member of any one of the above-mentioned gas separator fixing structures is fixed to the inner surface of the pressure container.

According to the present invention, there is provided a gas separating device in which a specific gas component in a gas to be treated which flows into the device through an inlet is allowed to permeate through the gas separation membrane and allowed to flow out from a first outlet, and the gas which does not permeate the gas separation membrane is allowed to flow out from a second outlet, characterized in that any one of the above-mentioned gas separator fixing structures is fixed in the container having said inlet, said first outlet and said second outlet.

In the present invention, it is preferred that there is provided a buffer which absorbs expansion of the gas separator.

BEST MODE FOR CARRYING OUT THE INVENTION

The embodiments of the present invention will be explained below. These embodiments should not be construed as limiting the invention in any manner, and changes and modifications of designing may be made based on the usual knowledge of one skilled in the art without departing from the spirit and scope of the present invention.

The first aspect of the present invention is a gas separator fixing structure provided with a gas separator having a gas separation membrane formed on at least one surface of a tubular support having a through hole in axial direction and comprising porous ceramics, characterized in that a cap-like metal member and a ring-shaped metal member are fixed to one and the other open end of the gas separator through seal members, respectively, and the seal members are gland packings. Furthermore, it is preferred that the cap-like metal member comprises a first cap-like or ring-shaped packing presser which gives a tightening pressure to one gland packing in the axial direction of the tubular support and a ring-shaped or cap-like lower stopper which inhibits movement of the one gland packing, and the ring-shaped metal member comprises a second ring-shaped packing presser which gives a tightening pressure to another gland packing in the axial direction of the tubular support and a ring-shaped upper stopper which inhibits movement of the another gland packing. These will be explained in detail below.

Figure 1:
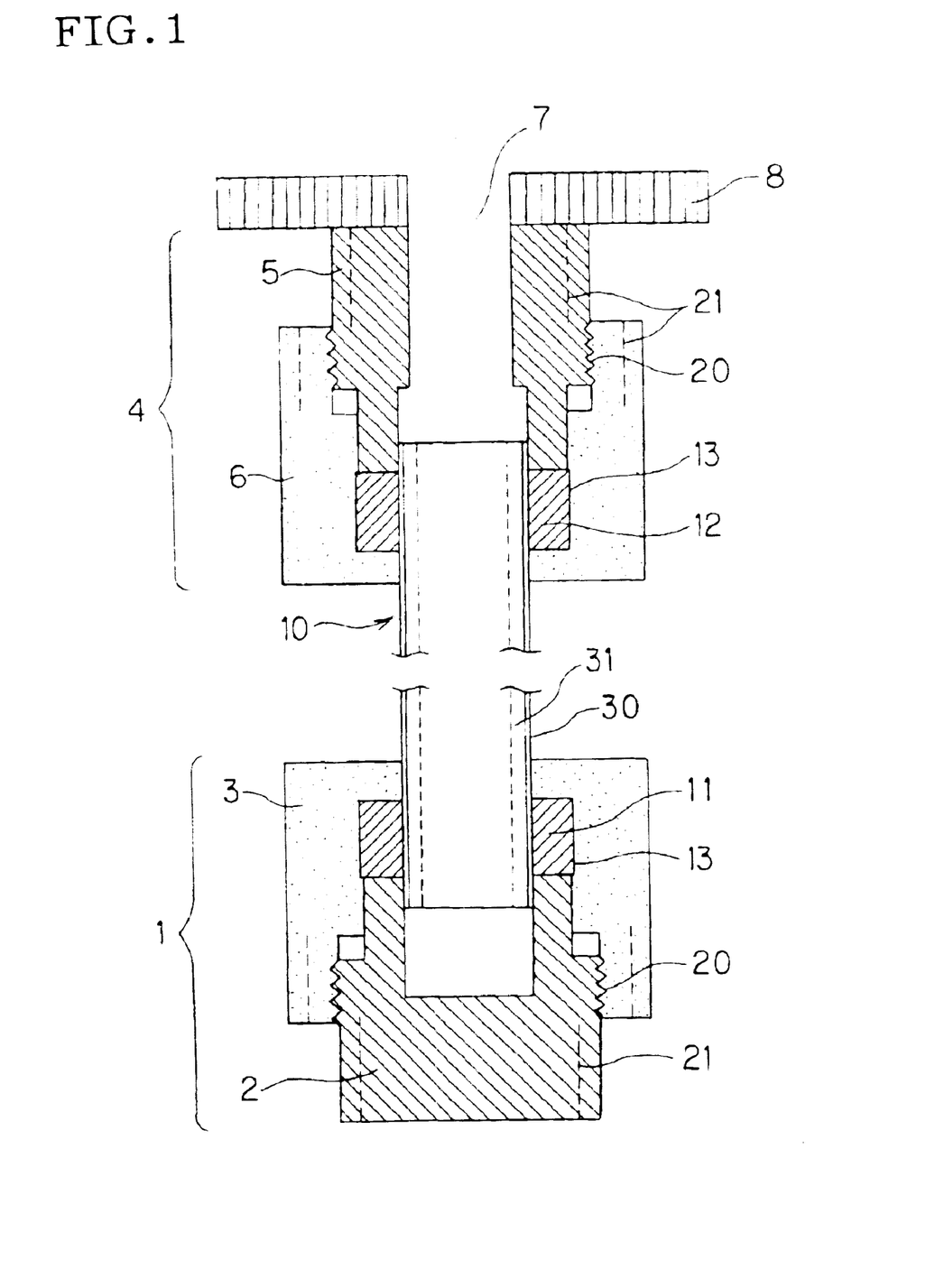
FIG. 1 is a sectional view which shows one embodiment of the gas separator fixing structure of the present invention.

FIG. 1 is a sectional view which shows one embodiment of the gas separator fixing structure of the present invention. The cap-like metal member 1 comprises a first cap-like packing presser 2 and a ring-shaped lower stopper 3, and the ring-shaped metal member 4 comprises a second ring-shaped packing presser 5 and a ring-shaped upper stopper 6. The ring-shaped metal member 4 (the second packing presser 5) is bonded to a flange 8 having a through hole 7 by a bonding method which ensures air-tightness, such as welding method.

The cap-like metal member 1 and the ring-shaped metal member 4 are provided with gland packings 11 and 12 as seal members in such a manner that the gland packings contact with outer peripheral surface of the gas separator 10. In this case, there may be provided stuffing boxes 13, each of which can contain at least one of packings 11 and 12, and the gland packings 11 and 12 are stored in the stuffing boxes 13. However, it is necessary that the gland packings 11 and 12 directly contact with the outer peripheral surface of the gas separator 10.

The first packing presser 2 and the second packing presser 5 can give a tightening pressure to the gland packings 11 and 12 in the axial direction of the tubular support 31, and the lower stopper 3 and the upper stopper 6 inhibit the movement of the gland packings 11 and 12 in axial direction caused by the application of tightening pressure to the gland packings 11 and 12. In this case, the gland packings 11 and 12 inhibited from movement actually stick to the surface of the gas separation member 30 under a proper pressure in the inner direction of diameter of the gas separator 10, namely, in the direction perpendicular to the membrane surface with undergoing some deformation, thereby securing the air-tightness between the gas separator 10 and the cap-like metal member 1 and ring-shaped metal member 4. The tightening pressure given to the gland packings 11 and 12 stored in the stuffing box 13 can be more effectively transferred to the gas separator 10 by the stuffing box 13.

Furthermore, from the viewpoints of reducing the number of parts and more easily securing the air-tightness, it is preferred that the first packing presser 2 has a convex shape which directly presses the gland packing 11 by its tip portion, and the lower stopper 3 has a concave shape which directly contacts with the gland packing 11 and fits to the convex shape of the first packing presser 2, and the second packing presser 5 has a convex shape which directly presses the gland packing 12 by its tip portion, and the upper stopper 6 has a concave shape which directly contacts with the gland packing 12 and fits to the convex shape of the second packing presser 5.

A thread groove 20 may be formed at the portion where the first packing presser 2 and the lower stopper 3 contact with each other and at the portion where the second packing presser 5 and the upper stopper 6 contact with each other in order to give a tightening pressure to the gland packings 11 and 12 and hold the tightening pressure. Moreover, in the peripheral part of the first packing presser 2, the lower stopper 3, the second packing presser 5 and the upper stopper 6, there may be formed a chamfer 21 in order to make easy the screwing which is carried out using a wrench or the like.

Figure 2:
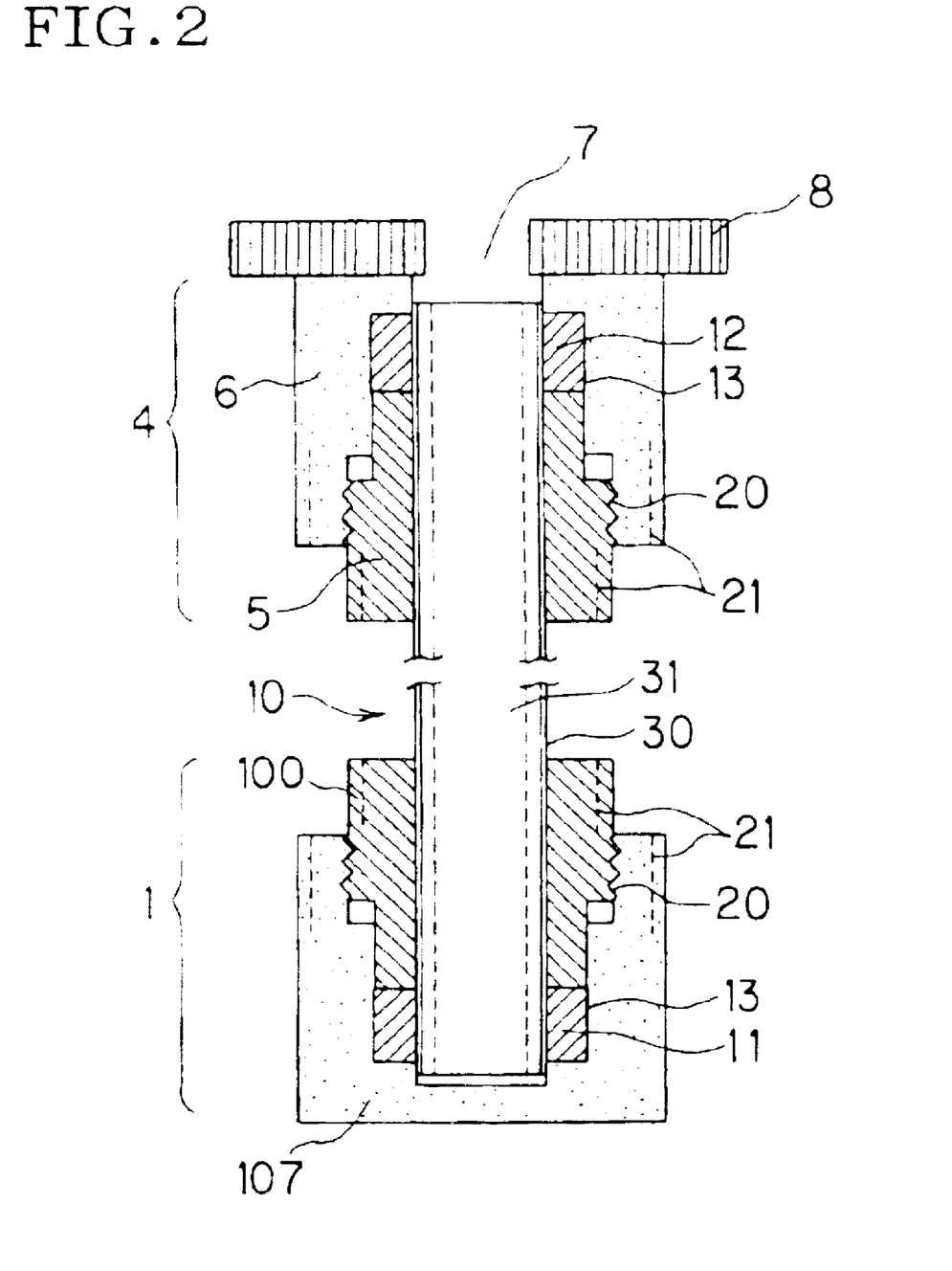
FIG. 2 is a sectional view which shows another embodiment of the gas separator fixing structure of the present invention.

FIG. 2 is a sectional view which shows another embodiment of the gas separator fixing structure of the present invention. The cap-like metal member 1 comprises a first ring-shaped packing presser 100 and a ring-shaped lower stopper 107, and the ring-shaped metal member 4 comprises a second ring-shaped packing presser 5 and a ring-shaped upper stopper 6. The ring-shaped metal member 4 (the upper stopper 6) is bonded to a flange 8 having a through hole 7 by a bonding method such as welding method. Other members, for example, gland packings 11 and 12, stuffing box 13, etc. are disposed in the same positional relation as in the gas separator fixing structure shown in FIG. 1, and the gland packings 11 and 12 directly contact with the outer peripheral surface of the gas separator 10.

That is, in the gas separator fixing structure of the present invention, the direction of the tightening pressure given to the gland packing by the first ring-shaped packing presser may be any of upper and lower direction as far as it is axial direction of the tubular support 31 as shown in FIG. 1 and FIG. 2, and free design can be made depending on the purpose and use.

Next, the second aspect of the present invention will be explained. The second aspect of the present invention is a gas separator fixing structure provided with a gas separator having a gas separation membrane formed on at least one surface of a tubular support having a through hole in axial direction and comprising porous ceramics, characterized in that ring-shaped metal members are fixed to both open ends of the gas separator through seal members, respectively, and the seal members are gland packings. Furthermore, it is preferred that the ring-shaped metal member comprises a ring-shaped packing presser which gives a tightening pressure to a gland packing in the axial direction of the tubular support and a ring-shaped stopper which inhibits movement of the gland packing. The detail of the second aspect will be explained below.

Figure 3:
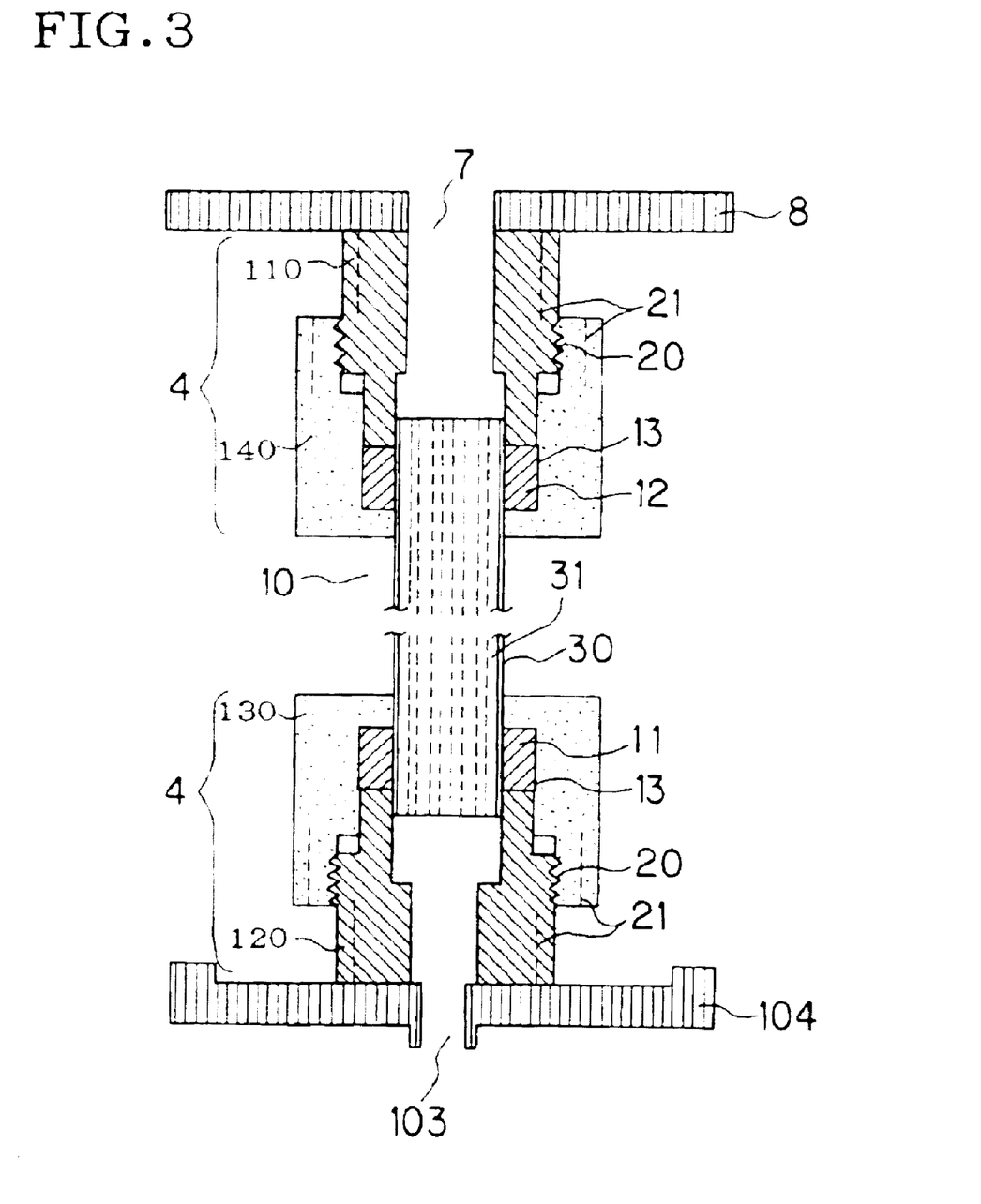
FIG. 3 is a sectional view which shows further another embodiment of the gas separator fixing structure of the present invention.

FIG. 3 is a sectional view which shows further another embodiment of the gas separator fixing structure of the present invention. The ring-shaped metal member 4 comprises ring-shaped packing pressers 110 and 120 and ring-shaped stoppers 130 and 140, and the ring-shaped metal member 4 (ring-shaped packing pressers 110 and 120) is bonded, by a bonding method such as welding method, to a flange 8 having a through hole 7 or a vessel body 104 to which the gas separator fixing structure is fitted.

The ring-shaped metal member 4 is provided with gland packings 11 and 12 as seal members in such a manner that the gland packings contact with outer peripheral surface of the gas separator 10. In this case, there may be provided stuffing boxes 13, each of which can contain at least one of packings 11 and 12, and the gland packings 11 and 12 are stored in the stuffing boxes 13. However, it is necessary that the gland packings 11 and 12 directly contact with the outer peripheral surface of the gas separator 10.

The ring-shaped packing pressers 110 and 120 can give a tightening pressure to the gland packings 11 and 12 in the axial direction of the tubular support 31, and the ring-shaped stopper 130 and 140 inhibit the movement of the gland packings 11 and 12 in axial direction caused by the application of tightening pressure to the gland packings 11 and 12. In this case, the gland packings 11 and 12 inhibited from movement actually stick to the surface of the gas separation membrane 30 under a proper pressure in the inner direction of diameter of the gas separator 10, namely, in the direction perpendicular to the membrane surface with undergoing some deformation, thereby securing the air-tightness between the gas separator 10 and the ring-shaped metal member 4. The tightening pressure given to the gland packings 11 and 12 stored in the stuffing box 13 can be more effectively transferred to the gas separator 10 by the stuffing box 13.

Furthermore, from the viewpoints of reducing the number of parts and more easily securing the air-tightness, it is preferred that the ring-shaped packing pressers 110 and 120 have a convex shape which directly presses the gland packings 11 and 12 by its tip portion, and the ring-shaped stoppers 130 and 140 have a concave shape which directly contacts with the gland packings 11 and 12 and can fit to the convex shape of the ring-shaped packing pressers 110 and 120.

A thread groove 20 may be formed at the portion where the ring-shaped packing pressers 110 and 120 and the ring-shaped stoppers 130 and 140 contact with each other in order to give a tightening pressure to the gland packings 11 and 12 and hold the tightening pressure. Moreover, in the peripheral part of the ring-shaped packing pressers 110 and 120 and the ring-shaped stoppers 130 and 140, there may be formed a chamfer 21 in order to make easy the screwing which is carried out using a wrench or the like.

As mentioned above, in the gas separator fixing structure shown in FIG. 3, the direction of the tightening pressure given to the gland packing by the ring-shaped packing presser may also be any of upper and lower directions as far as it is axial direction of the tubular support, and free design can be made depending on the purpose and use.

In the gas separator fixing structure of the present invention, the gas separator is fixed to each metal member through a gland packing as a seal material without utilizing glass bonding or brazing. Therefore, breakage of the gas separator caused by difference in thermal expansion hardly occurs, and, furthermore, even when temperature rises in real use of the gas separator, air-tightness is sufficiently secured and the structure shows excellent endurance against load of heat cycles. Moreover, there is no need to carry out increase of clamping of packing presser even at high temperatures, and troubles of maintenance and examination can be diminished.

Moreover, in the present invention, the maximum value of operating temperature range of the gland packing is preferably 300° C. or higher, more preferably 350° C. or higher, especially preferably 450° C. or higher. This is because in order to increase diffusion rate of hydrogen atom or the like in a gas separation membrane, it is preferred that the gas separator fixing structure can be used at high temperatures. In the present invention, the upper limit of the maximum value of the operating temperature range of the gland packing is not particularly limited, and it may be about 1650° C. or lower from the viewpoints of substantial heat resistance and the like.

Furthermore, in the present invention, the maximum value of operating temperature range of the gland packing in a non-oxidizing atmosphere is preferably 350° C. or higher, more preferably 450° C. or higher, especially preferably 600° C. or higher. In the present invention, the upper limit of the maximum value of the operating temperature range of the gland packing in a non-oxidizing atmosphere is not particularly limited, and it may be about 1650° C. or lower from the viewpoints of substantial heat resistance and the like.

Moreover, in the present invention, it is preferred that the main component of the gland packing is expanded graphite. Since the gland packing mainly composed of expanded graphite shows high heat resistance and high pressure resistance and besides is an excellent elastic material, the air-tightness between the gas separator and the cap-like metal member and ring-shaped metal member can be sufficiently secured in the gas separator fixing structure of the present invention in which the gland packing mainly composed of expanded graphite is used, and this gas separator fixing structure can be used under the conditions of high temperature and high pressures.

In addition to the expanded graphite, asbestos fibers, metal fibers, etc. can be mentioned as materials of packing which have such a heat resistance that the maximum value of the operating temperature range is 300 or higher, but the asbestos fibers are not preferred because they may adversely affect the human bodies (causing troubles in health) and the metal fibers are not preferred because they may mar the surface of gas separation membrane to which the packing is compression-fixed. Therefore, these problems can be solved by using expanded graphite as the main component of the gland packing.

The tubular support comprising porous ceramics which is one of the members constituting the gas separator fixing structure of the present invention supports the gas separation membrane because the gas separation member alone is low in mechanical strength. The term "porous" here means, for example, having a large number of three-dimensionally communicating fine pores, and the pore diameter is preferably 0.003–20 $\mu$m, more preferably 0.005–5 $\mu$m. If the pore diameter is less than 0.003 $\mu$m, resistance against passing of gas is high, and if the pore diameter exceeds 20 $\mu$m, pin holes are apt to be formed in the gas separation membrane, which is not preferred.

In the present invention, the porous ceramics constituting the tubular support is preferably alumina, with which the gas to be treated does not react. Furthermore, the porous tubular support comprising alumina can be easily made to a desired shape, and can be easily produced by a method disclosed, for example, in JP-A-62-273030.

In the present invention, it is preferred that the tubular support has a plurality of through holes arranged in rows. However, the shape of the tubular support is not limited to a columnar shape, and, for example, it may be of a square pillar, and may be of a column or square pillar which is curved along its axis. Moreover, shape of the through holes is not limited to linear shape, and may be of a curve.

Moreover, in the present invention, the gas separation membrane is preferably a hydrogen separation membrane through which hydrogen is selectively permeated, and metals which constitute the gas separation membrane which shows the selective permeability are preferably palladium or metals containing palladium. The metals containing palladium include palladium simple substance and palladium alloys. In the case of the palladium alloys, content of the metal other than palladium is preferably 10–30 mass % as mentioned in Journal of Membrane Science, 56(1991) 315–325:"Hydrogen Permeable Palladium-Silver Alloy Membrane Supported on Porous Ceramics" and JP-A-63-295402. The main object to make palladium alloyed is to protect palladium against hydrogen embrittlement and to improve separation efficiency at high temperatures. Furthermore, for protection of palladium against hydrogen embrittlement, it is preferred that silver is contained as a metal other than palladium.

The surface covered with the gas separation membrane may be outer surface and/or inner surface of the tubular support, and the method for covering the tubular support with the gas separation membrane can be any generally known methods, and there may be employed, for example, a chemical plating method, a vacuum evaporation method, a sputtering method, etc.

In the present invention, it is preferred that the thermal expansion coefficient of the material constituting the cap-like metal member and/or ring-shaped metal member at a temperature within the range of operating temperature is preferably $10 \times 10^{-6}$/° C. or smaller, more preferably $9 \times 10^{-6}$/° C. or smaller, and especially preferably $8 \times 10^{-6}$/° C. or smaller. The thermal expansion coefficient of the tubular support comprising porous ceramics is usually $10 \times 10^{-6}$/° C. or smaller because the thermal expansion coefficient of the tubular support and that of cap-like metal member and/or ring-shaped metal member are preferably close to each other from the viewpoints of control of change in stress value of the gland packing and inhibition of breakage of the tubular support. Therefore, leakage of the gas to be separated or breakage of the tubular support under high temperature conditions can be inhibited by reducing the thermal expansion coefficient of the cap-like metal member and/or ring-shaped metal member to lower than the above value.

In the present invention, the lower limit of the thermal expansion coefficient of the materials constituting the cap-like metal member and/or ring-shaped metal member is not particularly limited, and they can be used without any problems when the thermal expansion coefficient is about $0.4 \times 10^{-6}$/° C. or higher from the viewpoint of easy availability of the materials.

Furthermore, as the suitable metals constituting the cap-like metal member and/or ring-shaped metal member which have a thermal expansion coefficient of $10 \times 10^{-6}$/° C. or lower, mention may be made of Permalloy, Kovar, Invar, Super Invar, molybdenum, tungsten, iron-nickel alloys, etc., and Permalloy is especially preferred. Thus, leakage of the gas to be separated or breakage of the tubular support under high temperature conditions can be effectively inhibited.

An extremely small amount of gas to be treated (unseparated gas) which unavoidably incorporates from the sealing face between the gas separator 10 and the gland packings 11 and 12 is present in the separated gas which permeates from the outer peripheral side to the inner peripheral side of the gas separator 10 (FIG. 1). However, considering the use of the resulting separated gas, presence of an extremely small amount of the gas to be treated may be permitted as far as the amount of the gas is such that the use of the separated gas is not affected. For example, when it is supposed that the resulting separated gas is hydrogen and is to be used for hydrogen purifier for fuel cells, 99 vol % or higher is enough as the purity of the hydrogen gas.

Therefore, when the material of the cap-like metal member 1 and the ring-shaped metal member 4 is SUS304 (thermal expansion coefficient: $17 \times 10^{-6}/°$ C.), since the thermal expansion coefficient is 2–3 times that of the porous ceramics, leakage of the extremely small amount of the gas to be treated is supposed to occur with decrease of stress of the gland packings 11 and 12 under high temperature conditions, but the gas separator fixing structure of the present invention can be suitably employed depending on the use of the resulting separated gas (FIG. 1).

The gas separator fixing structure of the present invention is suitably usable at a temperature in the range of 250–1650° C., and more suitably usable at a temperature in the range of 300–600° C. due to its excellent endurance against thermal stress or heat cycle. Moreover, it is suitably usable in the pressure range of 0.1–10 MPa in total pressure of the gas to be treated.

Next, the third aspect of the present invention will be explained. The third aspect of the present invention is a gas separating device provided with a pressure container, characterized in that the ring-shaped metal member which is a part of any one of the above-mentioned gas separator fixing structures is fixed to the inner surface of the pressure container. The detail thereof will be explained below.

Explanation will be made taking the case where the gas separator fixing structure shown in FIG. 1 is incorporated into the device. The ring-shaped metal member 4, more specifically, a part of the second packing presser 5, is bonded to the flange 8 or the like by a suitable bonding method such as welding, whereby the ring-shaped metal member is fixed to the inner surface of the pressure container (not shown) which is a constituting element of the gas separating device. Since one of the open ends of the gas separator 10 is air-tightly closed by the cap-like metal member 1 through the packing 11, the separated gas which permeates through the gas separator 10 flows towards the open end (through hole 7) to which the ring-shaped metal member 4 is fixed and is discharged from the pressure container. Other gases in the gas to be treated do not permeate the gas separator and are discharged from an outlet (not shown) provided at the pressure container.

Here, in the gas separating device of the present invention, the portion where the gas separator fixing structure is fixed to the inner surface of the pressure container is only the one end portion having through hole 7, and the cap-like metal member 1, namely, another end, is not fixed to the inner surface of the pressure container (FIG. 1). Therefore, there hardly occurs the breakage due to the expansion and shrink of the gas separator which are caused by the load of heat cycle, and there is exhibited the effect of being able to use the device for a long period of time.

Next, the fourth aspect of the present invention will be explained. The fourth aspect of the present invention is a gas separating device in which a specific gas component in a gas to be treated which flows into the device through an inlet is allowed to permeate through a gas separation member and to flow out from a first outlet, and the gas which does not permeate through the gas separation member is allowed to flow out from a second outlet, characterized in that any one of the above-mentioned gas separator fixing structures in which the ring-shaped metal members are respectively fixed to both open ends of the gas separator through seal members is fixed in a container having said inlet, said first outlet and said second outlet. The detail of the device will be explained below.

Figure 4:
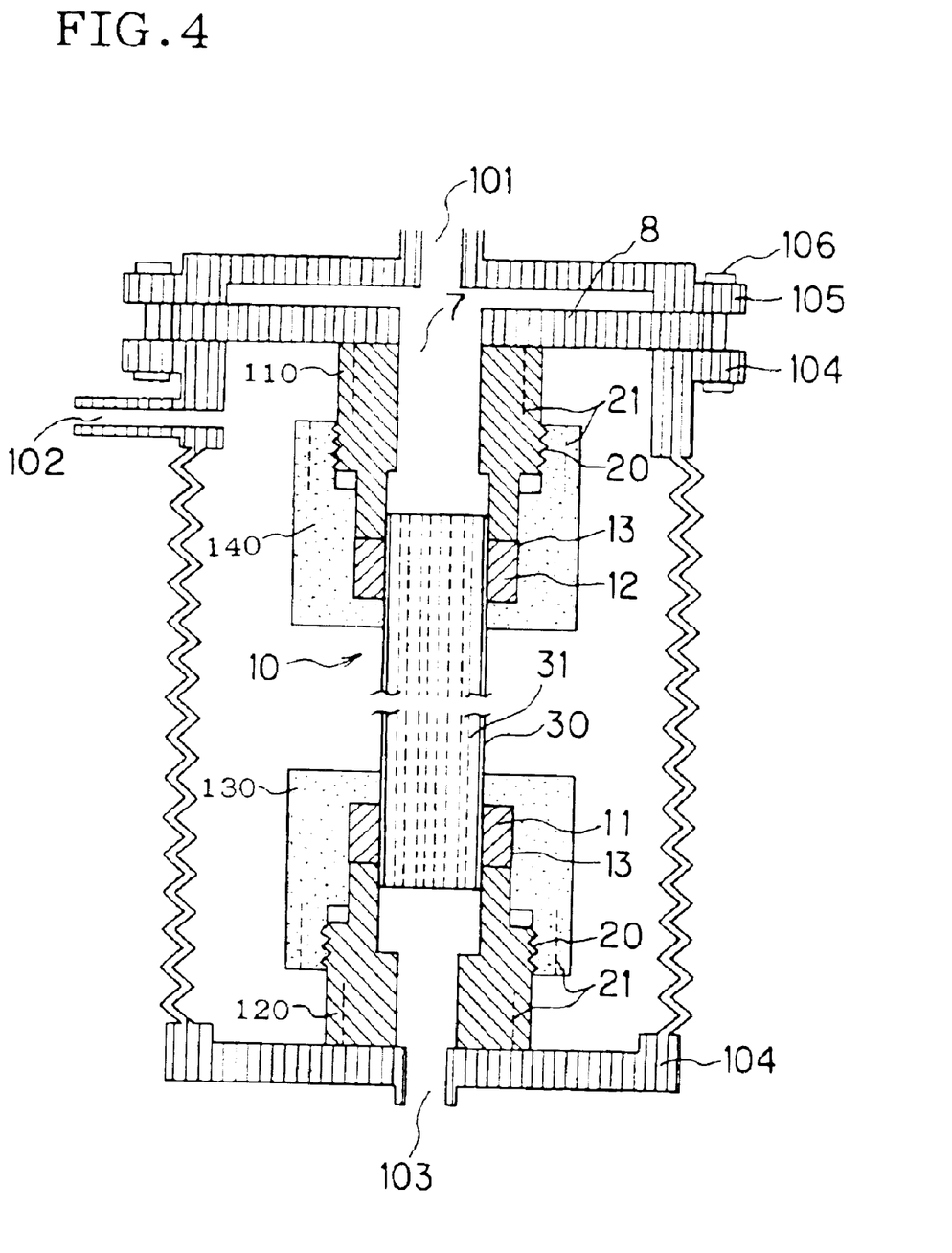
FIG. 4 is a sectional view which shows one embodiment of the gas separating device of the present invention.

FIG. 4 is a sectional view which shows one embodiment of the gas separating device of the present invention. In FIG. 4, the gas to be treated which is introduced from an inlet 101 enters into the gas separator 10 from one end thereof through the through hole 7 of the flange 8. The separated gas selectively permeates through a gas separation member 30 and flows out of the gas separator 10, and flows out from an outlet 102. On the other hand, the gas which does not permeate is discharged from another end of the gas separator 10 through an outlet 103. In FIG. 4, the reference numeral 105 indicates a lid and 106 indicates a fixing member.

As mentioned above, in the case of introducing the gas to be treated from the inside of the gas separator, when the gas to be treated is introduced from one end of the gas separator and the gas which does not permeate is discharged from the another end, it is necessary that one end of the gas separator is supported inside the container body and besides both ends of the gas separator are allowed to communicate with the outlet or the inlet of the container body. Therefore, there is the possibility that the gas separating device is broken or the structure connecting the gas separator with the outlet or the inlet of the container body is damaged owing to the difference in thermal expansion of the gas separator and the container body. In the present invention, it is preferred to provide a buffer which absorbs the expansion of the gas separator, by which occurrence of the above problems can be avoided.

Specifically, in order to inhibit the gas separating device from breaking due to the difference in thermal expansion of the container body 104 and the gas separator 10, the outer peripheral surface of the container body 104 may be provided with bellows to form a structure to permit extension and contraction in the axial direction of the gas separator 10 as shown in FIG. 4. The portion of the bellows undergoes a pressure of the permeating gas, but the pressure of the permeating gas is generally low, namely, from negative pressure to 0.2 MPa, and hence the force which extends the bellows can be ignored.

Moreover, there is another method of using a pipe having elasticity and wound in the form of a spring for connecting the through hole with the outlet or inlet of the container.

EXAMPLES

The present invention will be specifically explained by examples, which should not be construed as limiting the invention in any manner.
(Gas Separator and Gas Separator Fixing Structure)

As a gas separator was used a porous tubular support which was made of alumina, had an outer diameter of 10.7 mm, an inner diameter of 7.5 mm and a length of 40 mm and a small pore diameter of 0.1 $\mu$m, and was plated with metallic palladium in a thickness of 18 $\mu$m. Furthermore, braided gland packings made of expanded graphite were used as the gland packings constituting the gas separator fixing structure and as the metal members, those made of 45 Permalloy were used. The thermal expansion coefficients of the porous tubular support were $7.1 \times 10^{-6}/°$ C. (40–300° C.)

and $7.7\times10^{-6}/°$ C. (40–600° C.), and those of the metal members were $7.3\times10^{-6}/°$ C. (40–300° C.) and $9.9\times10^{-6}/°$ C. (40–600° C.).

(Production of Gas Separator Fixing Structure)

A gas separator fixing structure as shown in FIG. 1 was produced. First, two of the gland packings 11 and 12 were stored in the stuffing boxes 13, respectively, and the first packing presser 2 and the second packing presser 5 were lightly screwed until they contacted with the gland packings 11 and 12, thereby tentatively fixing the gland packings 11 and 12. Then, the above gas separator 10 was inserted into the cap-like metal member 1 and the ring-shaped metal member 4. In this case, the insertion was carried out until the open ends of the gas separator 10 were positioned deeper than the gland packings 11 and 12. Then, the first packing presser 2 and the second packing presser 5 were fastened in by a torque wrench so that the tightening pressure in axial direction reached 20 MPa and the tightening pressure in inner direction of diameter (in the direction perpendicular to the surface of the gas separation membrane) reached about 10 MPa, and thus a gas separator fixing structure was produced.

(Air-Tightness Test)

The air-tightness test was conducted by fixing the above gas separator fixing structure in a pressure container through a metal gasket.

The air-tightness test was conducted in the following manner. Argon gas was introduced into the side of the gas separator which was to be treated (outer peripheral side) under a pressure of 0.9 MPa and held therein. In this state, the gas separator was heated from room temperature to 600° C. and then cooled to room temperature. This temperature cycle was repeated 5 times, and flow rates of argon gas which leaked to the separated gas side (inner peripheral side) at room temperature (25° C.), 300° C. and 600° C. were measured. The results are shown in Table 1.

TABLE 1

| | | Flow rate of argon gas (ml/min.) Temperature of measurement | | |
|---|---|---|---|---|
| Example | | 25° C. | 300° C. | 600° C. |
| Number | 1 | 0.4 | 0.1 | 0.3 |
| of | 2 | 0.7 | 0.4 | 0.3 |
| cycles | 3 | 0.8 | 0.4 | 0.3 |
| (times) | 4 | 1.0 | 0.5 | 0.4 |
| | 5 | 1.1 | 0.5 | 0.4 |

(Discussion)

The permissible amount of the gas which leaks from the seal portion (permissible amount of gas leaking from the seal portion) depends on the area of the separation membrane, the amount of hydrogen permeating through the separation membrane, and the amount of the gas to be treated permeating through pin holes of the separation membrane. Taking these conditions into consideration, the permissible amount of the gas leaking from the seal portion at 300° C. is assumed to be about 30 ml/min. In this case, as is clear from the results shown in Table 1, in the gas separator fixing structure of the present invention, the amount of leaking argon gas is extremely small even after being subjected to the temperature cycles, namely, is reduced to about 1/60 (1/several tens) of the permissible amount of the gas leaking from the seal portion, and a sufficient air-tightness is secured from low temperature area (25° C.) to high temperature area (600° C.). Therefore, it is considered that a gas separating device which is less in leakage of gas and can be used for a long period of time can be provided by using the gas separator fixing structure of the present invention.

Industrial Applicability

As explained above, in the gas separator fixing structure of the present invention, a given metal member is fixed to an open end of the gas separator through a gland packing, and hence there hardly occurs breakage of a tubular support constituting the gas separator caused by thermal stress and reduction of air-tightness between the gas separator and the metal member as a supporter supporting the gas separator caused by load of heat cycles, and besides there is a merit that the gas separator fixing structure can be used even under the conditions of high temperatures.

Furthermore, in the gas separating device of the present invention, the above gas separator fixing structure is fixed to the inner surface of a pressure container in a given state, and hence there hardly occurs breakage due to the expansion and shrink of the gas separator caused by the load of heat cycles, and the device can be used for a long period of time.

What is claimed is:

1. A gas separator fixing structure provided with a gas separator having a gas separation membrane formed on at least one surface of a tubular support having a through hole in axial direction and comprising porous ceramics, characterized in that a cap-like metal member and a ring-shaped metal member are compression-fixed to one and the other open end of the gas separator through seal members, respectively, and seal members are gland packings.

2. A gas separator fixing structure according to claim 1, wherein the cap-like metal member comprises a first cap-like or ring-shaped packing presser which gives a tightening pressure to one of the gland packings in the axial direction of the tubular support and a ring-shaped or cap-like lower stopper which inhibits movement of the one of the gland packings, and the ring-shaped metal member comprises a second ring-shaped packing presser which gives a tightening pressure to another gland packing in the axial direction of the tubular support and a ring-shaped upper stopper which inhibits movement of the another gland packing.

3. A gas separator fixing structure according to claim 2, wherein the first packing presser has a convex shape which directly presses one of the gland packings by us tip portion, and the lower stopper has a concave shape which directly contacts with the one of the gland packings and fits to the convex shape of the first packing presser, and the second packing presser has a convex shape which directly presses another gland packing by its tip portion, and the upper stopper has a concave shape which directly contacts with the another gland packing and can fit to the convex shape of the second packing presser.

4. A gas separator fixing structure according to claim 2, wherein each of the upper and lower stoppers have a bore passing at least partially thereibrough and the bore has a first internal diameter for receiving the gland seal and a second, larger internal diameter for receiving at least a portion of the packing presser.

5. A gas separator fixing structure according to claim 1, wherein the tubular support has a plurality of through holes arranged in rows.

6. A gas separator fixing structure according to claim 1, wherein the maximum value of operating temperature range of the gland packing is 300° C. or higher.

7. A gas separator fixing structure according to claim 1, wherein the maximum value of operating temperature range of the gland packing in a non-oxidizing atmosphere is 350° C. or higher.

8. A gas separator fixing structure according to claim 7, wherein the maximum value of operating temperature range of the gland packing in a non-oxidizing atmosphere is 600° C. or higher.

9. A gas separator fixing structure according to claim 1, wherein the main component of the gland packings is expanded graphite.

10. A gas separator fixing structure according to claim 1, wherein the porous ceramics is alumina.

11. A gas separator fixing structure according to claim 1, wherein the gas separation membrane is a hydrogen separation membrane through which hydrogen selectively permeates.

12. A gas separator fixing structure according to claim 1, wherein the gas separation membrane comprises palladium or a metal containing palladium.

13. A gas separator fixing structure according to claim 1, wherein the material constituting the cap-like metal member and/or ring-shaped metal member has a thermal expansion coefficient of $4 \times 10^{-6} - 10 \times 10^{-6}/°$ C.

14. A gas separator fixing structure according to claim 1, wherein the material constituting the cap-like metal member and/or ring-shaped metal member is Permalloy.

15. A gas separator fixing structure according to claim 1 which is used at a temperature in the range of 250–1650° C.

16. A gas separator fixing structure according to claim 1 which is used at a temperature in the range of 300–600° C.

17. A gas separator fixing structure according to claim 1 which is used under a pressure of 0.1–10 MPa in the total pressure of the gas to be treated.

18. A gas separator fixing structure provided with a gas separator having a gas separation membrane formed on at least one surface of a tubular support having a through hole in axial direction and comprising porous ceramics, characterized in that ring-shaped metal mewbers are fixed to both open ends of the gas separator through seal members, respectively, and the seal members are gland packings.

19. A gas separator fixing structure according to claim 18, wherein the ring-shaped metal member comprises a ring-shaped packing presser which gives a tightening pressure to the gland packing in the axial direction of the tubular support and a ring-shaped stopper which inhibits movement of the gland packing.

20. A gas separator fixing structure according to claim 19, wherein the ring-shaped packing presser has a convex shape which directly presses the gland packing by its tip portion, and the ring-shaped stopper has a concave shape which directly contacts with the gland packing and can fit to the convex shape of the ring-shaped packing presser.

21. A gas separating device comprising a gas separator fixing structure provided with a gas separator having a gas separation membrane formed on at least one surface of a tubular support having a through hole in axial direction and comprising porous ceramics, wherein a cap-like metal member and a ring-shaped metal member are compression-fixed to one and the other open end of the gas separator through seal members, respectively, and seal members are gland packings, and being provided with a pressure container, wherein the ring-shaped metal member is fixed to an inner surface of the pressure container.

22. A gas separating device comprising a gas separator fixing structure provided with a gas separator having a gas separation membrane formed on at least one surface of a tubular support having a through hole in axial direction and comprising ceramics, wherein the gas separator fixing structure is fixed in a container having an inlet, a first outlet and a second outlet, wherein a specific gas component in a gas to be treated which flows into the device from an inlet is allowed to permeate the gas separation membrane and to flow out from the first outlet, and a gas which does not permeate through the gas separation member is allowed to flow out from the second outlet, and wherein ring-shaped metal members are fixed to both open ends of the gas separator through seal members, respectively, and the seal members are gland packings.

23. A gas separating device according to claim 22 which is provided with a buffer which absorbs expansion of the gas separator.

* * * * *

UNITED STATES PATENT AND TRADEMARK OFFICE
CERTIFICATE OF CORRECTION

PATENT NO. : 6,958,087 B2
DATED : October 25, 2005
INVENTOR(S) : Kenji Suzuki

Page 1 of 1

It is certified that error appears in the above-identified patent and that said Letters Patent is hereby corrected as shown below:

Title page,
Item [57], ABSTRACT, delete in its entirety and replace with the following:
-- The gas separator fixing structure of the present invention is characterized in that it is provided with a gas separator 10 having a gas separation membrane 30 formed on at least one surface of a tubular support 31 having a through hole 7 in axial direction and comprising porous ceramics, a cap-like metal member 1 and a ring-shaped metal member 4 are fixed to one and the other open end of the gas separator 10 through seal members, respectively, and seal members are gland packings 11 and 12. A gas separating device can be provided with causing hardly the breakage of the tubular support constituting the gas separator 10 due to the thermal stress and the reduction of air-tightness between the gas separator 10 and the supporter supporting the gas separator due to load of heat cycles, and besides which can be used even under conditions of high temperatures. --.

Column 12,
Line 44, please change "us" to -- its --.
Line 55, change "thereibrough" to -- therethrough --.
Line 65, change "1" to -- 6 --.

Column 13,
Line 35, change "mewbers" to -- members --.

Signed and Sealed this

Fourteenth Day of February, 2006

JON W. DUDAS
*Director of the United States Patent and Trademark Office*